April 28, 1953

M. DE HAAS 2,636,579

TAILSTOCK SPINDLE CLAMPING DEVICE

Filed Sept. 24, 1947

INVENTOR.
Max De Haas
BY Woodling and Krost,
Attorneys

INVENTOR.
Max De Haas
BY Woodling and Krost,
Attorneys

Patented Apr. 28, 1953

2,636,579

UNITED STATES PATENT OFFICE 2,636,579

TAILSTOCK SPINDLE CLAMPING DEVICE

Max De Haas, Dayton, Ohio, assignor to The Monarch Machine Tool Company, a corporation of Ohio Application September 24, 1947, Serial No. 775,873

6 Claims. (Cl. 188—151)

My invention relates to machine tools in general, and more particularly to a power actuated tailstock for lathes.

My device may be used with freely rotating tailstock centers, usually referred to as live centers, or with non-rotative centers known as plain centers.

An object of my invention is to provide an actuating device for a tailstock center which may be employed to produce an active pressure upon a workpiece by a live center tailstock, or which may be employed to slightly back off the tailstock with reference to the workpiece without backlash when a plain center is used.

Another object of my invention is to provide a power driven tailstock center positioning device.

Another object of my invention is to provide precision control for a hydraulic tailstock positioning device.

Another object of my invention is to provide a servo-motor between a manual control and the tailstock center for positioning the center without backlash.

Still another object of my invention is to provide a hydraulic power positioning device and a precision control for the power positioning device, wherein one part of the control is moved a precisely controllable amount and in so moving starts movement of the power device, and thereafter the power device moves another part of the control to automatically shut off the control upon moving to the desired position.

Yet another object of my invention is to provide hydraulic locking means to lock the tailstock center in position after having been moved to a desired position by the actuating device.

A still further object of my invention is to provide a high speed and a vernier precision movement means to precisely position the one part of the control that operates the hydraulic power positioning device and starts movement of the power device.

Other objects and a fuller understanding of my invention may be had by referring to the following description and claims, taken in conjunction with the accompanying drawing, in which:

Basically, my invention is directed to a power positioning device and control mechanism to accurately position a tailstock center and comprises a stationarily mounted piston and a longitudinally reciprocable cylinder about the piston. The cylinder carries the tailstock center. The piston therefore provides two separate chambers within the cylinder, and the cylinder may be longitudinally reciprocated relative to the piston by introducing fluid under pressure into a selected one of the chambers and exhausting fluid from the other chamber.

The position of the cylinder relative to the piston is precisely controlled by a valve member having a body and an internal member longitudinally movable relative to one another to direct fluid to the chambers within the cylinder and exhaust fluid therefrom. In the embodiment of my invention illustrated herein, the body of the valve is interconnected with the cylinder and reciprocates longitudinally therewith. The internal member of the valve is manually positionable relative to the tailstock device. Therefore, by manually moving the internal member of the valve, fluid may be directed to a selected one of the chambers and cause the cylinder to move in a selected direction. This movement of the cylinder carries the body portion of the valve a like distance in the same direction and therefore repositions the valve body portion relative to the internal member to shut off the flow of fluid to the selected chamber and stop movement of the cylinder. Therefore, the movement of the cylinder can be precisely controlled by moving the internal member of the valve.

Figure 1:
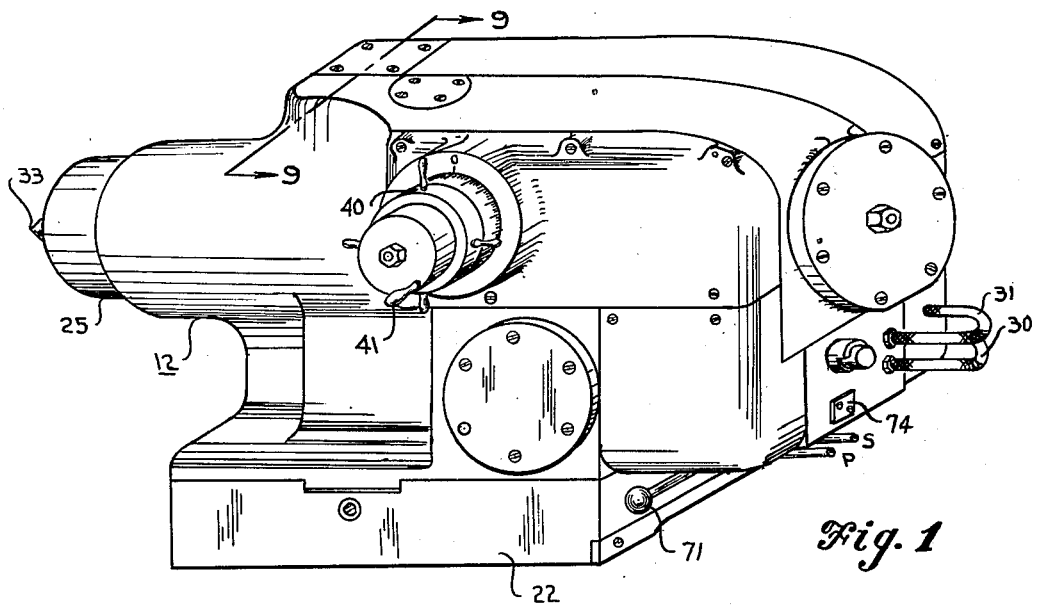
Figure 1 is a perspective view of a tailstock for a lathe, employing the principles of my invention.

In the Figure 1, I illustrate my tailstock device having a base 22 adapted to reciprocably ride on the ways of a lathe. This tailstock device is equipped with my improved power positioning device and control mechanism to accurately position a center 33. The center 33 is positioned by movement of either a high speed handle 40, or a vernier handle 41.

Figure 2:
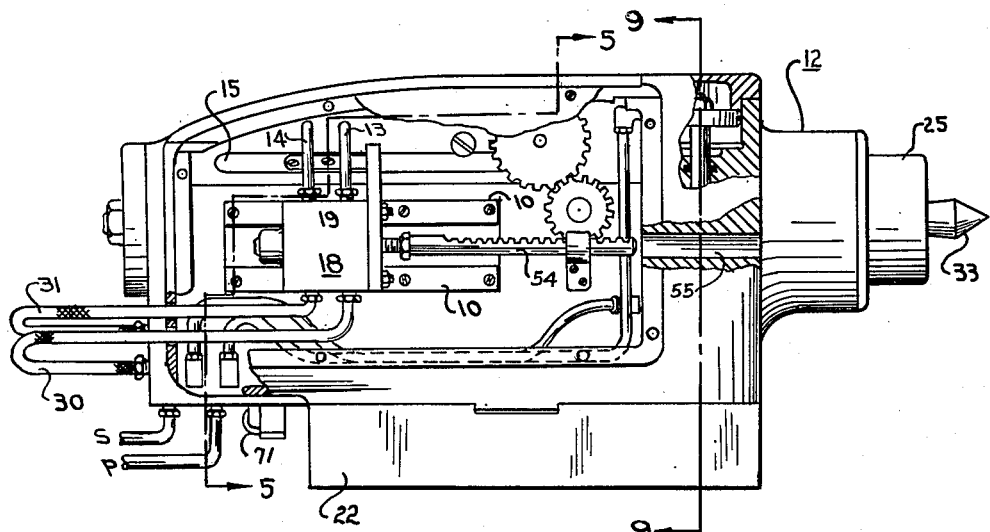
Figure 2 is an elevational view of the tailstock from the side opposite that of Figure 1, with cover plates removed to expose the mechanism therein; and includes section 2—2 of Figure 9.
Figure 3:
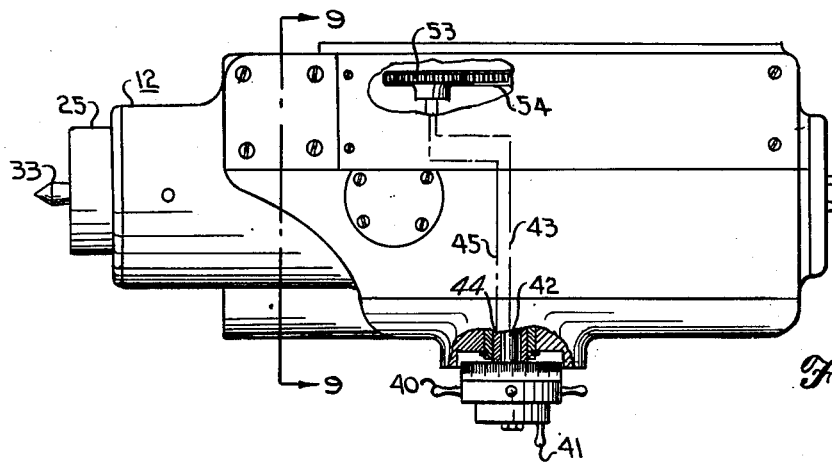
Figure 3 is a top view of the tailstock with portions of the enclosure broken away to illustrate the high speed and vernier precision movement means.
Figure 4:
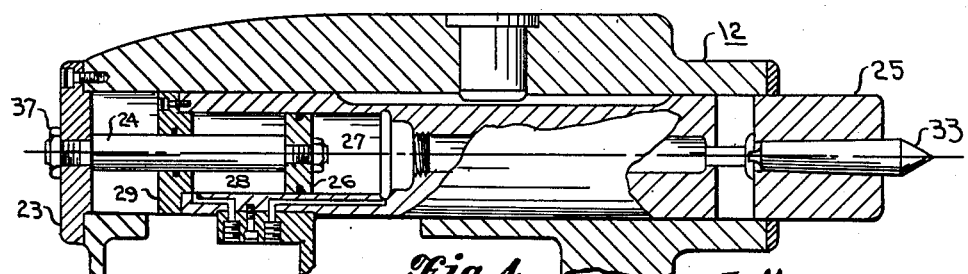
Figure 4 is a view of the actual center and actuating mechanism, as taken through line 4—4 of Figure 5.

In Figure 4 of the drawings, I illustrate my improved power positioning device, and in the Figures 2 and 3, I illustrate the relationship thereof with the precision control device.

In the illustration, the reference character 25 indicates a cylinder which is longitudinally movable with reference to the lathe bed. The cylinder 25, in this particular embodiment, is employed to carry the center 33 of a machine tool lathe tailstock. A piston 26 is mounted within the cylinder 25, and thereby divides the interior of the cylinder 25 into a forward chamber 27 and a rear chamber 28. The cylinder 25 is provided with an end wall 29, and in the practice of my invention, a piston rod 24 extends from the piston 26 through the end wall 29 to the exterior of the cylinder 25. It is necessary to provide the usual caution against leakage by employing suitable packing between the end wall 29 and the cylinder 25, and between the end wall 29 and the piston rod 24. The piston rod 24 extends through an opening in the end wall 29 and is secured to a stationary plate 23 by means of a shoulder abutting against one side of the stationary plate 23 and by a securing nut 37 threadably engaged to the other end. That is, the piston rod 24 is adapted to extend through the end wall 29 as illustrated in the Figure 4 to engage the stationary plate 23 and the securing nut 37 is threaded on the end thereof and adapted to draw the piston rod 24 tight in relation to the stationary plate 23. Therefore, the cylinder 25 is adapted to reciprocate, and the piston 26 is secured against movement, which constitute members of a prime mover.

Figure 6:
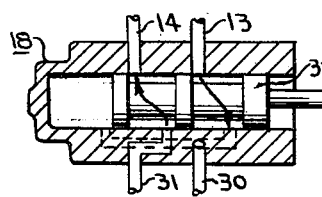
Figure 6 is a sectional view of the precision control valve device in a position to retract the power driven positioning device.
Figure 7:
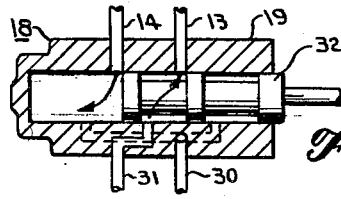
Figure 7 is a sectional view of the precision control valve device in a position to advance the power driven positioning device.
Figure 8:
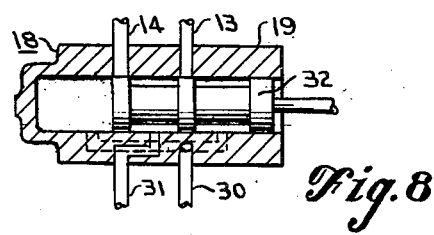
Figure 8 is a sectional view of the precision control valve device in a stop position to arrest movement of the power driven positioning device.
Figure 5:
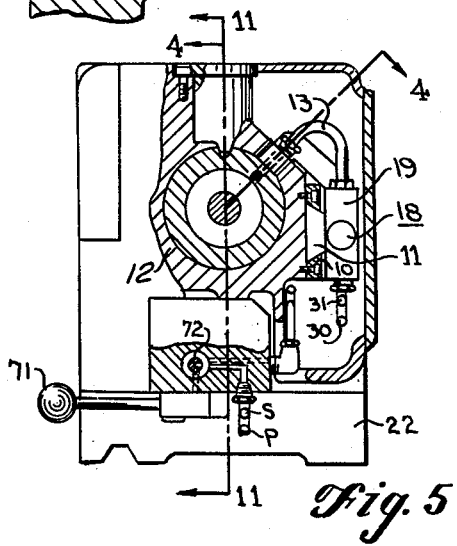
Figure 5 is a view through the line 5—5 of Figure 2 of the internal mechanism of the tailstock.

The cylinder 25 is supported for longitudinal movement in a frame 12 of the tailstock. The frame 12, therefore, guides and supports the cylinder 25 as it moves to position the center 33. As illustrated in the Figures 2 and 5, I have provided a dovetail way 10 secured to the frame 12, and a dovetail 11 adapted to slide in the dovetail way 10. A valve or valve means 18, as best illustrated in Figures 6, 7 and 8, having a valve body 19 and a valve member 32 is employed to control the flow of fluid into the chambers 27 and 28. The valve body 19 is mounted on the dovetail 11, and is thereby adapted to reciprocate with the dovetail 11. In the Figures 2 and 5 I illustrate fluid conduits 13 and 14 which are employed to conduct fluid from the valve body 19 to and from the chambers 27 and 28, respectively. The conduits 13 and 14 are of the inflexible type, and are secured to the valve body 19 at one end thereof and to the cylinder 25 at the other end thereof. Therefore, as the cylinder 25 moves forward and backward, the valve body 19 is carried along an equal distance. In other words, the cylinder 25 and the valve body 19 move as a unit with the dovetail 11 and the dovetail way 10 serving as slidable carriage means. In the Figure 2 of the drawing, it may be seen that a longitudinal opening 15 has been provided in the frame 12 to allow the longitudinal movement of the supply conduits 13 and 14 along with the movement of the cylinder 25.

In the embodiment of my invention illustrated, I have chosen to mount the valve body 19 to move correspondingly to movement of the movable cylinder 25, and to mount the valve member 32 for manual adjustment relative to the frame 12, and consequently relative to the valve body 19. Of course, the converse arrangement could be adapted to operate equally well. As may be seen in the Figures 6, 7 and 8, the valve member 32 may be positioned relative to the valve body 19, and thereby direct the fluid into a selected one of the chambers 27 or 28, and cause the cylinder 25 to advance or retract the center 33. A supply line 31 from a fluid pressure pump is provided to supply fluid under pressure to the valve 18, and an exhaust header 30 is provided to return the exhausted fluid to the source of supply. Thus, as illustrated in the Figure 7, for example, if the valve member 32 is moved to the illustrated position, oil under pressure will be supplied through the supply line 31 to the fluid conduit 13 and hence to the chamber 27. Fluid pressure in the chamber 27, will cause the cylinder 25 to advance the center 33. Any fluid in the chamber 28 is then exhausted through the fluid conduit 14 to the exhaust header 30 and back to the source of supply. However, advancement of the cylinder 25 will carry the valve body 19 therealong, and thus move the valve body 19 into the position illustrated in the Figure 8. Of course, the conduits 13 and 14 are closed off by the valve member 32 in the illustration of Figure 8, and therefore further movement of the cylinder 25 is stopped. Thus, the distance which the operator of my improved tailstock desires to move the center 33 may be very accurately controlled by accurately moving the valve member 32. The reverse operation, that is to retract the center 33, may be accomplished by moving the valve member 32 in an opposite direction, as illustrated in Figure 6 of the drawing. Such a movement would allow fluid under pressure to pass from the supply line 31 into the fluid conduit 14 and hence into the chamber 28. Fluid is then exhausted from the chamber 27 through the fluid conduit 13 and out through the exhaust header 30 to the source of supply. Such a valving action will cause the cylinder 25 to retract until the valve body 19 is carried along to the position illustrated in the Figure 8.

In the Figure 3 of the drawings, I illustrate my improved control for manually moving the valve member 32. A rack 54 driven by a gear 53 is adapted to actuate the valve member 32, and the rack 54 is in turn actuated by the high-speed control handle 40 and the vernier low-speed control handle 41 through suitable gearing mechanism.

I illustrate a shaft 42 adapted to be driven by the handle 41. Any suitable vernier, or slow speed drive mechanism may be employed to extend from the shaft 42 and drive the gear 53. I therefore illustrate the vernier drive by the dot-dash line 43.

A tubular shaft or sleeve 44 extends about the shaft 42 and is adapted to be driven by the handle 40. Any suitable high speed, or direct, drive mechanism may be employed to extend from the tubular shaft or sleeve 44 and drive the gear 53. I therefore illustrate the high speed drive by the dot-dash line 45. The rack 54 when actuated by the gear 53 is adapted to project into a longitudinal opening 55.

By the provision of my high speed drive handle 40, the operator of the tailstock device may position the valve member 32 rapidly in the direction that the center 33 is to be moved. After the center 33 has been positioned close to the desired position it is to occupy, the operator may use the vernier handle 41 and position the valve member 32 a very slight amount to cause an exceedingly small movement of the center 33. In fact, by use of the vernier handle 41, the valve member 32 may be positioned to cause the cylinder 25 and center 33 to move only a very few thousandths of an inch.

When used with the live center, the center may be advanced tightly into contact with the work piece, and may be held tightly in contact therewith by advancing the valve member 32 further than the contact of the center with the work piece will allow the cylinder to advance.

There is no mechanical back lash to be reckoned with between the cylinder 25 and the piston 26 as there is with a mechanical tailstock device. Therefore, when the cylinder 25 is employed to move a plain center, after the plain center has been moved into tight contact with a work piece, the cylinder 25 may be reversed a few thousandths of an inch to relieve the pressure. In my device, the cylinder and piston are of a servo-motor type, and there is no back lash to cause inaccurate positioning of the center 33.

Thus, my improved device may be used to actuate either a live or plain center. When used for a live center, the valve 18 may be moved to cause the cylinder 25 to produce an active pressure upon a work piece. When used with a plain center, on the other hand, the center may be slightly backed off with reference to the work piece to relieve the pressure.

In the Figure 2 of the drawings, it will be noted that the supply line 31 and the exhaust line 30 are flexible tubing of a well known type, in order to provide flexible couplings between the source of supply and the valve 18.

To summarize the operation of positioning the center 33, the operator positions the valve member 32 relative to the valve body 19 of the valve 18 in order to cause a flow of fluid under pressure to either the chamber 27 or 28 within the cylinder 25. By so positioning the valve member 32, fluid will flow either as illustrated in the Figure 6 of the drawing, or Figure 7 of the drawing, to direct the fluid under pressure to the selected chamber. Accordingly, the cylinder 25 moves in a predetermined direction. As the cylinder 25 moves in the predetermined direction, it carries the valve body 19 therealong by means of the interconnecting fluid conduits 13 and 14. Thus, the valve body is carried to the shut-off position illustrated in Figure 8 and further movement is stopped. The valve body 19 follows the valve member 32, and therefore accurate positioning of the valve member 32 is the control for positioning the cylinder 25. The fluid conduits 13 and 14 are rigid and secured at one end to the cylinder 25 and at the other end to the valve body 19. Of course, the fluid conduits 13 and 14 also serve to conduct fluid to and from the chambers 27 and 28, as well as serving as connecting means to carry the valve body 19 along with the movement of the cylinder 25. Accordingly, my invention comprises hydraulic power positioning device and a precision control for the power positioning device wherein one part of the control is moved a precisely controllable amount and in so moving starts movement of the power device, and thereafter the power device moves another part of the control to automatically shut off the control upon moving to the desired position.

Figure 10:
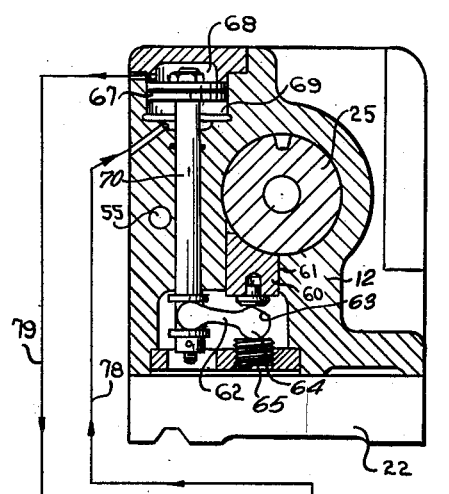
Figure 10 is the valve and circuit of Figure 9 in position to clamp the spindle.
Figure 11:
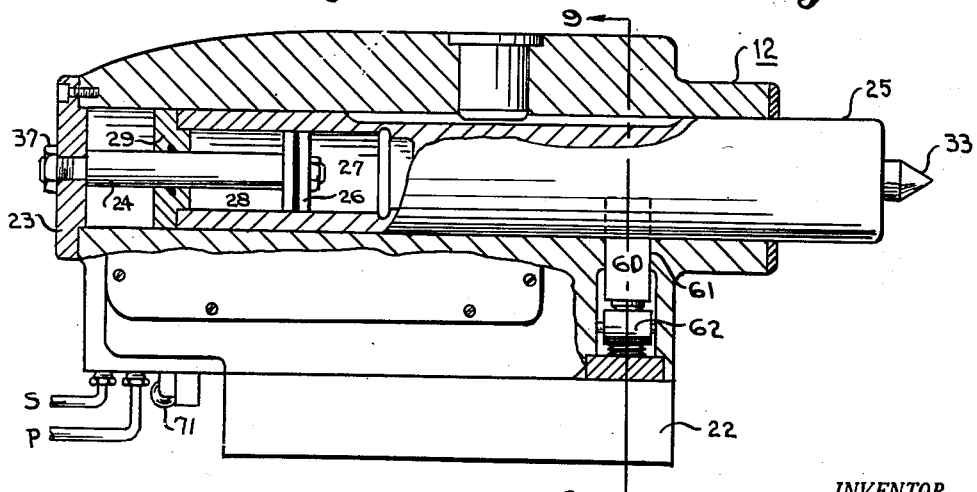
Figure 11 is a cross sectional view along the line 11—11 of Figure 5.

After having positioned the center 33 in exactly the desired position, it is desirable, and very often necessary, to clamp or lock the cylinder 25 against movement as the result of outside forces acting upon the center 33. Mechanical means have long been used for this purpose in the conventional tailstock devices. However, I have developed a novel and useful clamp means to hold the cylinder 25 in position. The preferred embodiment of the clamp means is illustrated in the Figures 9, 10 and 11 of the drawings.

The clamp means comprises generally a brake shoe 60 adapted to reciprocate in a guide way 61 in the frame 12. An actuating arm 62 is provided with a cylindrical body 64 having a flat surface 63 thereon to serve as cam means to actuate said brake shoe 60. The distance across the cylindrical body to the flat surface 63 is less than the full diameter of the cylindrical body 64. Therefore, the cylindrical body serves as a cam to move the brake shoe 60. An adjustable base or abutment 65 is provided to support the cylindrical body 64 relative to the brake shoe 60. Thus, the actuating arm 62 may be tilted as illustrated in the Figure 10 to press the brake shoe 60 tightly into contact with the outside diameter of the cylinder 25 and thereby hold the cylinder 25 against longitudinal movement. On the other hand, the actuating arm 62 may be tilted downwardly as illustrated in the Figure 9 to present the flat surface 63 to the brake shoe 60, and thereby provide a greater amount of space between the base 65 and the cylinder 25 to allow the brake shoe 60 to drop away from the surface of the cylinder 25. The cylinder 25 will therefore be free to reciprocate when the arm 62 is tilted downwardly as illustrated in the Figure 9.

In order to tilt the arm 62, I have provided a servo-type motor having a cylinder 66 and a piston 67. The piston 67 divides the cylinder into an upper chamber 68 and a lower chamber 69. Therefore, fluid under pressure may be directed into the lower chamber 69 to move the piston 67 upwardly and thereby pull upwardly on a piston rod 70 and tilt the actuating arm 62 as illustrated in the Figure 10 to apply braking action by forcing the brake shoe 60 into contact with the cylinder 25. Conversely, fluid under pressure may be supplied to the upper chamber 68 and force the piston rod 70 downwardly as illustrated in Figure 9 to tilt the actuating arm 62 downwardly and allow the brake shoe 60 to release the cylinder 25.

In the Figure 1 of the drawing, at the bottom rearwardly portion of the tailstock device, a handle 71 will be seen extending from beneath a cover plate of the tailstock device. The handle 71 is employed to shift a valve member 72 of a valve 73, illustrated diagrammatically in Figures 9 and 10. The end of the valve 73 may be covered by an end plate 74, see Figures 1, 9 and 10.

The valve 73 is adapted to supply fluid under pressure to either the upper chamber 68 or the lower chamber 69. In the Figure 10, I illustrate the valve 73 diagrammatically, and it will be seen that the fluid under pressure is supplied to the valve 73 from a pressure source indicated by the letter P. It will be seen that the valve member 72 is provided with a longitudinal passageway 75 over a portion of the length thereof. Fluid therefore travels from the pressure source P through line 76 into the passageway 75. When the handle 71 is moved to the position illustrated in the Figure 10, the valve member 72 is shifted to direct the fluid under pressure from the line 76 out through line 78 to the lower chamber 69. Fluid from the upper chamber is simultaneously exhausted through a line 79 out through the passageway 75 to a supply storage designated S. The handle 71 is allowed to remain in this position continually so long as the cylinder 25 is to be clamped in position, and thereby a continuous active pressure is exerted on the actuating arm 62 to hold the actuating arm 62 in the clamped or locked position. Therefore, the piston 67 and the piston rod 70 will exert a continual pressure upon the actuating arm 62 to hold the brake shoe 60 tightly in contact with the cylinder 25.

Figure 9:
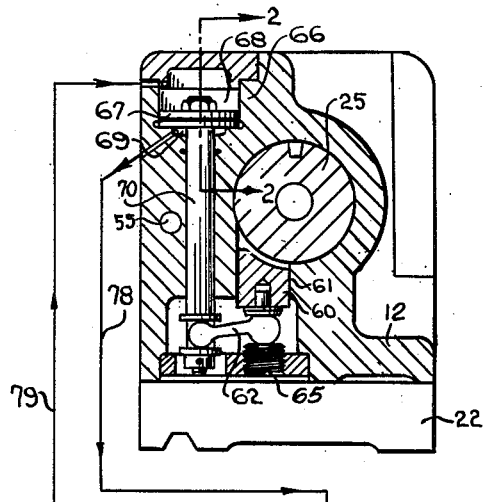
Figure 9 is a diagrammatic illustration of the hydraulic circuit for the spindle lock mechanism, illustrating the flow when the clamp is released, the cross section being taken along the line 9—9 of Figure 11.

When the operator desires to actuate the cylinder 25, he will shift the handle 71 to the position illustrated in the Figure 9. Shifting in this manner will shift the valve member 72 to direct the fluid under pressure from the passageway 76 out through the line 79 to the upper chamber 68. Fluid from the lower chamber 69 is simultaneously exhausted through the line 78 out through the valve 73 to a supply storage. Thus, an active force is placed upon the piston 67 and the piston rod 70 to position the actuating arm 62 in a downwardly tilted position as illustrated in the Figure 9, and the brake shoe 60 is permitted to drop downwardly into contact with the flat surface 63 on the cylindrical body 54, and thereby release the cylinder 25 for free longitudinal movement.

With the arrangement of the power actuating mechanism which may be controlled at a high speed by the handle 40, and at a low speed by the handle 41, to position a center 33, and by the provision of the described clamping or locking mechanism to hold the actuating mechanism and the center 33 in a selected position by active hydraulic force, I have provided a tailstock device for the industry which will permit a degree of accuracy and ease of operation heretofore unknown in the machine tool trade.

This application is related to the copending application of Raymond A. Lauterbur and Claude S. Doll, entitled Tailstock Carriage and Clamping Means, Serial Number 775,936 filed September 24, 1947, now Patent Number 2,540,586.

Although I have described my invention with a certain degree of particularity in its preferred form it is understood that the present disclosure of the preferred form has been made only by way of example and that numerous changes in the details of construction and the combination and arrangement of parts may be resorted to without departing from the spirit and the scope of the invention as hereinafter claimed.

I claim:

1. In a fluid pressure operated clamp for first and second relatively movable members, the improvement comprising guide means in said first member, a brake shoe translatable in said guide means and adapted to frictionally engage said second member to act as a clamp or brake therefor, a lever having first and second ends each with substantially circular cross-section, said first end of said lever having a flattened surface constituting a cam member, a cam follower on said brake shoe for cooperation with said cam member, a threaded aperture in said first member in alignment with the axis of the translational movement of said brake shoe, a plug threadable in said threaded aperture for variable adjustment along said axis, said cam member being disposed between said cam follower and said threaded plug, a fluid servomotor having a cylinder carried by said first member, a piston axially movable relative to said first member and said cylinder, linkage means between said piston and second end of said lever to provide movement thereto, and a fluid valve for said servomotor and having first and second positions, said valve when in said first position directing fluid under pressure to one end of said cylinder to actuate said piston and cam member to a position whereat said flat surface of said cam member cooperates with said cam follower to release the clamping engagement of said brake shoe on said second member, and said valve when in said second position directing fluid under pressure to the opposite end of said cylinder to actuate said piston and cam member to a position whereat said circular cross-section of said cam member cooperates with said cam follower to translate said brake shoe into clamping engagement with said second member.

2. In a fluid pressure operated clamp for selectively locking a reciprocable tailstock quill carried by and reciprocable in a tailstock frame, the improvement comprising guide means in said frame, a brake shoe translatable in said guide means and adapted to frictionally engage said quill to act as a clamp or brake therefor, a lever having first and second ends each with substantially circular cross-section, said first end of said lever having a flattened surface constituting a cam member, a cam follower on said brake shoe for cooperation with said cam member, a threaded aperture in said frame in alignment with the axis of the translational movement of said brake shoe, a plug threadable in said threaded aperture for variable adjustment along said axis, said cam member being disposed between said cam follower and said threaded plug, a fluid servomotor having a cylinder carried by said frame, a piston axially movable relative to said frame and said cylinder, linkage means between said piston and second end of said lever to provide movement thereto, and a fluid valve for said servomotor and having first and second positions, said valve when in said first position directing fluid under pressure to one end of said cylinder to actuate said piston and cam member to a position whereat said flat surface of said cam member cooperates with said cam follower to release the clamping engagement of said brake shoe on said quill, and said valve when in said second position directing fluid under pressure to the opposite end of said cylinder to actuate said piston and cam member to a position whereat said circular cross-section of said cam member cooperates with said cam follower to translate said brake shoe into clamping engagement with said quill.

3. In a fluid pressure operated clamp for selectively locking a reciprocable tailstock quill carried by and reciprocable in a tailstock frame, the improvement comprising guide means in said frame, a brake shoe translatable in said guide means and adapted to frictionally engage said quill to act as a clamp or brake therefor, a lever having first and second ends each with substantially circular cross-section, said first end of said lever having a flattened surface constituting a cam member, a cam follower on said brake shoe for cooperation with said cam member, a threaded aperture in said frame in alignment with the axis of the translational movement of said brake shoe, a plug threadable in said threaded aperture for variable adjustment along said axis, said cam member being disposed between said cam follower and said threaded plug, a fluid servomotor having a cylinder carried by said frame, a piston axially movable relative to said frame and said cylinder, a shaft for said piston, axially spaced collars on said shaft, the circular cross-sectioned second end of said lever being disposed between said collars, axial movement of said piston effecting a partial rotation of said lever about said first end thereof, and a fluid valve for said servomotor and having first and second positions, said valve when in said first position directing fluid under pressure to one end of said cylinder to actuate said piston and cam member to a position whereat said flat surface of said cam member cooperates with said cam follower to release the clamping engagement of said brake shoe on said quill, and said valve when in said second position directing fluid under pressure to the opposite end of said cylinder to actuate said piston and cam member to a position whereat said circular cross-section of said cam member cooperates with said cam follower to translate said brake shoe into clamping engagement with said quill.

4. In a fluid pressure operated clamp, a frame, a first guideway in said frame, a member translatable in said first guideway; a second guideway in said frame oriented to intersect said first guideway, a brake shoe in said second guideway, said brake shoe being adapted to be translatable in said second guideway for selective clamping engagement with said member; an abutment in said frame, a cam with one side thereof resting on said abutment, the other side of said cam being adapted to engage and move said brake shoe upon movement of said cam; a third guideway in said frame, a rod in said third guideway, a lever on said cam, one end of said rod being adapted to engage said cam lever, a piston having first and second sides on the other end of said rod, a cylinder fixed relatively to the frame embracing said piston, and a plural position fluid valve connected to the cylinder to direct fluid pressure to the first side of said piston and exhaust the second side when in one position, and direct fluid pressure to the second side of said piston and exhaust the first side when in another position, whereby movement of said piston and rod causes movement of said cam lever and cam to move said brake shoe into and out of engagement with said member.

5. A fluid pressure operated clamp comprising, a frame, a first guideway in said frame, a member translatable in said first guideway, a second guideway intersecting said first guideway, a brake shoe translatable in said second guideway, a lever having a pivot point and an end opposite said pivot point oscillatable about its pivot point, an abutment in said frame, the pivot point end of said lever being in engagement with said abutment and said lever also being in engagement with said brake shoe, a cylinder on said frame, a piston in said cylinder dividing the cylinder into first and second chambers, a third guideway in said frame, a rod in said third guideway engaging both said piston and said opposite end of said lever, and a multiple position valve adapted while in one position to direct fluid pressure to said first cylinder chamber to urge said brake shoe into engagement with said member and while in another position to direct fluid pressure to said second cylinder chamber so that said brake shoe respectively locks and unlocks said member with respect to said frame.

6. A fluid pressure operated clamp comprising a frame, a first, second, and third guideway in said frame, said first and second guideways being oriented to intersect, a member translatable in said first guideway, a brake shoe translatable in said second guideway to bind said member, and a rod translatable in said third guideway, a cylinder aligned with said third guideway, a piston in said cylinder connected to said rod, and a lever engaging said brake shoe, said rod, and said frame, whereby movement of said piston in one direction causes binding of said brake shoe to said member, and movement in another direction causes unbinding of said brake shoe from said member.

MAX DE HAAS.

References Cited in the file of this patent

UNITED STATES PATENTS

| Number | Name | Date |
|---|---|---|
| 88,431 | Atkins | Mar. 30, 1869 |
| 1,285,980 | Gilman | Nov. 26, 1918 |
| 1,315,104 | Ewald | Sept. 2, 1919 |
| 1,883,166 | Vickers | Oct. 18, 1932 |
| 1,965,867 | Vickers | July 10, 1934 |
| 2,107,091 | Swennes | Feb. 1, 1938 |
| 2,118,020 | Curtis | May 17, 1938 |
| 2,214,176 | Portle | Sept. 10, 1940 |
| 2,271,817 | Ernst | Feb. 13, 1942 |
| 2,295,161 | Clay | Sept. 8, 1942 |
| 2,372,692 | Svenson | Apr. 3, 1945 |
| 2,411,290 | Pontius | Nov. 19, 1946 |
| 2,474,644 | Aitcheson et al. | June 28, 1949 |

FOREIGN PATENTS

| Number | Country | Date |
|---|---|---|
| 462,847 | Great Britain | Mar. 17, 1937 |
| 418,891 | Germany | Sept. 22, 1925 |